(12) United States Patent
Searles et al.

(10) Patent No.: US 7,770,037 B2
(45) Date of Patent: Aug. 3, 2010

(54) POWER OK DISTRIBUTION FOR MULTI-VOLTAGE CHIPS

(75) Inventors: Shawn Searles, Austin, TX (US); Scott C. Johnson, Austin, TX (US); Grace I. Chuang, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 936 days.

(21) Appl. No.: 11/408,226

(22) Filed: Apr. 20, 2006

(65) Prior Publication Data

US 2007/0250721 A1    Oct. 25, 2007

(51) Int. Cl.
G06F 1/26 (2006.01)
G06F 1/32 (2006.01)

(52) U.S. Cl. .............. 713/300; 713/320; 713/330; 713/340; 327/143

(58) Field of Classification Search ............ 713/300, 713/320, 330, 340; 327/143
See application file for complete search history.

(56) References Cited

U.S. PATENT DOCUMENTS

| | | | |
|---|---|---|---|
| 6,735,706 B2 * | 5/2004 | Tomlinson et al. ........ 713/300 |
| 6,792,553 B2 * | 9/2004 | Mar et al. ............... 713/330 |
| 6,868,501 B2 * | 3/2005 | Saitou et al. ............ 713/330 |
| 7,030,678 B1 | 4/2006 | Burinskiy | |
| 7,219,244 B2 | 5/2007 | Kuang | |
| 7,245,172 B2 | 7/2007 | Boerstler | |
| 7,376,847 B2 * | 5/2008 | Chen et al. ............. 713/300 |
| 2002/0165622 A1 | 11/2002 | Fujii | |
| 2005/0040863 A1 * | 2/2005 | Shumarayev et al. ...... 327/63 |
| 2005/0127756 A1 | 6/2005 | Shepard | |
| 2007/0157038 A1 * | 7/2007 | Clemo ................... 713/300 |

OTHER PUBLICATIONS

Notification of Transmittal of International Preliminary Report on Patentability, PCT/US2007/004369, Aug. 26, 2008.
International Search Report in application No. PCT/US2007/004369 mailed Dec. 7, 2007.

* cited by examiner

*Primary Examiner*—Thomas Lee
*Assistant Examiner*—Michael J Brown
(74) *Attorney, Agent, or Firm*—Meyertons, Hood, Kivlin, Kowert & Goetzel, P.C.; Eric A. Heter (57) ABSTRACT

A method and apparatus for powering up an integrated circuit (IC). An IC includes a plurality of power domains each coupled to receive power from one of a plurality of power sources. Each power domain includes a power-sensing unit. A power-sensing unit in a first one of the plurality of power domains is coupled to receive a first power ok signal from an upstream power domain, and is configured to assert a second power ok signal to be provided to a second power domain. A power-sensing unit in the second power domain is coupled to detect the presence of voltage in the first power domain, and to receive the first power ok signal. When the power-sensing unit in the second power domain has both sensed the presence of power in the first power domain and received the second power ok signal, a third power ok signal is asserted.

49 Claims, 7 Drawing Sheets

FIG. 1C
Out = 0 if Sane = 0
Out = input and inv of $\overline{input}$ if Sane = 1

POWER OK DISTRIBUTION FOR MULTI-VOLTAGE CHIPS

BACKGROUND OF THE INVENTION

1. Field of the Invention

This invention relates to electronic systems, and more particularly, to systems for ensuring the proper powering up of those systems.

2. Description of the Related Art

While some integrated circuits may receive power from a single power supply, other integrated circuits (ICs) may receive power from multiple power supplies. Often times, ICs will have different voltage and/or current requirements for various types of circuitry such as drivers, receivers, core circuitry, phase-locked loops (PLLs) and so forth.

Powering up an IC receiving power from only a single power supply may be a relatively straightforward process. However, when multiple power supplies provide power to an IC, powering up may require power to be applied to the various circuits in a specific sequence. Failure to apply power in the proper sequence may result in the damage or destruction of various individual circuits of the IC.

Even when damage to circuitry is not a concern, a failure to apply power in the proper sequence to an IC may prevent it from functioning correctly. Many types of ICs (such as microprocessors) are required to enter a reset state and then proceed through an initialization sequence before they can perform their intended functions. The initialization sequence may include certain units of the IC exchanging information with other units that receive power from a different power supply. If one of the units involved in the attempted information exchange is not fully powered up, the information exchange will not occur, and the IC will not initialize properly.

SUMMARY OF THE INVENTION

A method and apparatus for powering up an integrated circuit (IC) is disclosed. In one embodiment, an IC includes a plurality of power domains each coupled to receive power from one of a plurality of power sources. Each power domain includes a power-sensing unit. A power-sensing unit in a first one of the plurality of power domains is coupled to receive a first power ok signal from an upstream power domain, and is configured to assert a second power ok signal to be provided to a second power domain (downstream from the first). A power-sensing unit in the second power domain is coupled to detect the presence of voltage in the first power domain, and is further coupled to receive the first power ok signal. When the power-sensing unit in the second power domain has both sensed the presence of power in the first power domain and received the second power ok signal (originating in the first power domain), a third power ok signal is asserted. A downstream power domain may receive the third power ok signal.

In one embodiment, each of the power sources supplies power at a different voltage from the other power sources. Each of the power domains may be associated with one of the plurality of power sources, and may receive power at a voltage that is unique with respect to the power received by the other power domains. The power-sensing units of the various power domains may be coupled to each other in a daisy-chain topology. Each of the power-sensing units is coupled to receive a power ok signal from an upstream (as defined by the daisy chain topology) and is also configured to detect the presence of power in the upstream power domain. It should be noted that the power-sensing unit of the first power domain of the daisy chain may be coupled directly to its respective power source, and in some embodiments, the power received from the power source may also double as the power ok signal. If no upstream power is detected by a power-sensing unit of a given power domain, then no downstream power ok signal (i.e. a power ok signal provided to a power-sensing unit in a downstream power domain) is asserted. If the power-sensing unit of the given power domain detects power in the upstream power domain, then the state of the downstream power-ok signal will follow the state of the upstream power-ok signal (i.e. the power ok signal asserted by the power-sensing unit of the upstream power domain).

In various embodiments, different types of level shifting circuitry may be used to implement the power-sensing units. The use of level shifting circuits may allow the power-sensing unit of a given power domain to assert a downstream power ok signal using its own power based on detecting upstream power and the assertion of the received upstream power ok signal. Furthermore, requiring each power-sensing unit to utilize the power of its respective domain ensures that it will not inadvertently assert a power ok signal when the required power has not been received by its domain.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 1A:
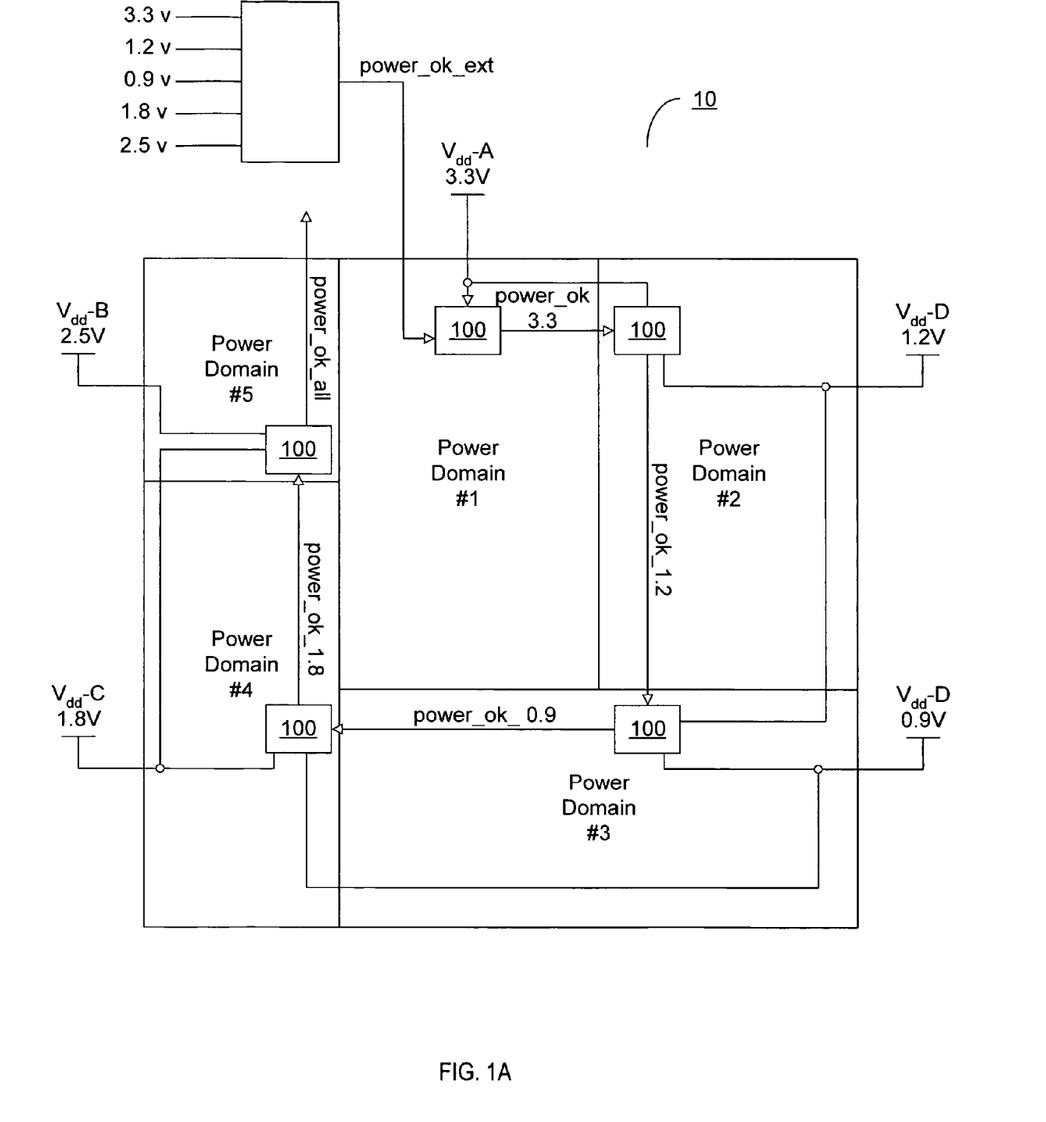
FIG. 1A is a drawing of one embodiment of an integrated circuit (IC) having a plurality of power domains.

Turning now to FIG. 1A, a drawing illustrating one embodiment of an integrated circuit (IC) having a plurality of power domains is shown. It should be noted that this embodiment is shown for illustrative purposes and is not intended to imply a specific integrated circuit layout. In general, the various embodiments of the method and apparatus described herein can be applied to a wide variety of layouts for IC's that require a plurality of different power sources (in terms of electrical requirements).

In this particular embodiment, IC 10 includes five separate power domains, each of which requires power at a voltage that is different with respect to the other power domains. A power domain may be defined as a circuit or groups of circuits which have the same power requirements and thus share a common power source. More particularly, a power domain may be defined as a circuit or group of circuits that operate at the same voltage. Thus, in the embodiment shown, a power domain #1 receives power at 3.3 volts, power domain #2 receives power at 1.2 volts, power domain #3 receives power at 0.9 volts, power domain #4 receives power at 1.8 volts, and power domain #5 receives power at 2.5 volts. It should be noted that embodiments of an IC having a greater or lesser number of power domains are possible and contemplated, as are embodiments of an IC receiving power at voltages different than shown here.

A power-sensing unit 100 is present in each of the power domains shown in this embodiment. In general, the power-sensing units are coupled to receive power from an upstream power source and an upstream power ok signal. The power-sensing units may then generate a power ok signal both for use in the given power domain an as an input to a downstream power sensing unit. For the purposes of this disclosure, an upstream power domain may be defined as one from which a power-sensing unit 100 receives a power ok signal, while a downstream power domain may be defined as one which a power-sensing unit provides a power ok signal. For example, power domain #1 may be considered to be upstream from power domain #2, since power domain #2 is coupled to receive a power ok signal from the power-sensing unit 100 of power domain #1. Power domain #3 may be considered to be downstream from power domain #2 since it receives a power ok signal from power domain #2.

In the embodiment shown, the power-sensing unit 100 of power domain #1 may be coupled to receive a power ok signal (power_ok_ext) indicating that each of IC's external power sources is operating. Other embodiments are possible and contemplated wherein no external power ok signal is provided to IC 10. When 3.3-volt power is received, along with any power ok signal that may be provided from the 3.3-volt power source, the power-sensing unit 100 of power domain #1 may assert a power ok signal, which is received by power-sensing unit 100 of power domain #2. In addition to receiving the power ok signal from upstream, power-sensing unit 100 of power domain #2 is also coupled to detect the presence of power in power domain #1. Responsive to both the detection of power in the upstream power domain and the receiving of the power ok signal, power-sensing unit 100 of power domain #2 may assert a power ok signal to be provided to a power-sensing unit in the downstream power domain (power domain #3).

In the manner described above, each power-sensing unit 100 of a given power domain may be coupled to both detect power and receive a power ok signal from an upstream power domain. Each power-sensing unit may also assert a power ok signal that may be provided to a power-sensing unit in a downstream power domain, with the exception of the most downstream power domain (power domain #5 in this case). In the embodiment shown, power-sensing unit 100 of power domain 5 is configured to assert a power ok responsive to detecting power in power domain #4, and receiving the asserted power ok signal that may be provided by its power-sensing unit. However, there is no further downstream power domain. In this case, power-sensing unit 100 of power domain #5 is configured to provide a power ok (power_ok_all) signal that is conveyed to the world external to IC 10. This may be useful in signaling to other components in an electronic system in which IC 10 is implemented that it is fully powered up. Power-sensing unit may also (or in lieu of) provide a power ok signal to other portions of IC 10, which may be held in a reset state until this power ok signal is received. Upon receiving the power ok signal from the power-sensing unit 100 of the most downstream power domain, IC 10 may be able to exit its reset state and begin any necessary initialization routines. Embodiments are possible and contemplated where no power ok signal is provided beyond the most downstream power domain.

Figure 1B:
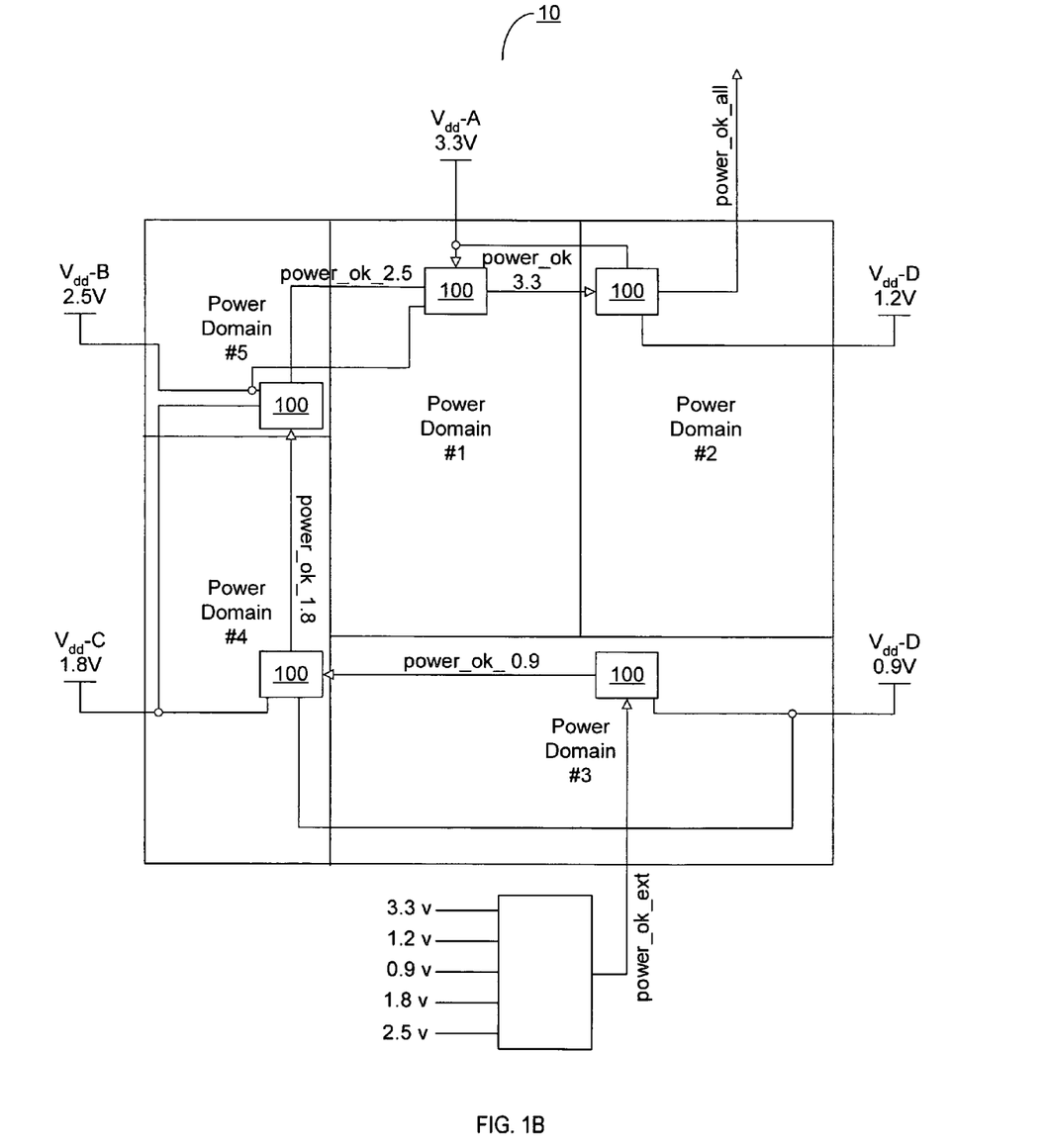
FIG. 1B is a drawing of another embodiment of an IC having a plurality of power domains.
Figure 1C:
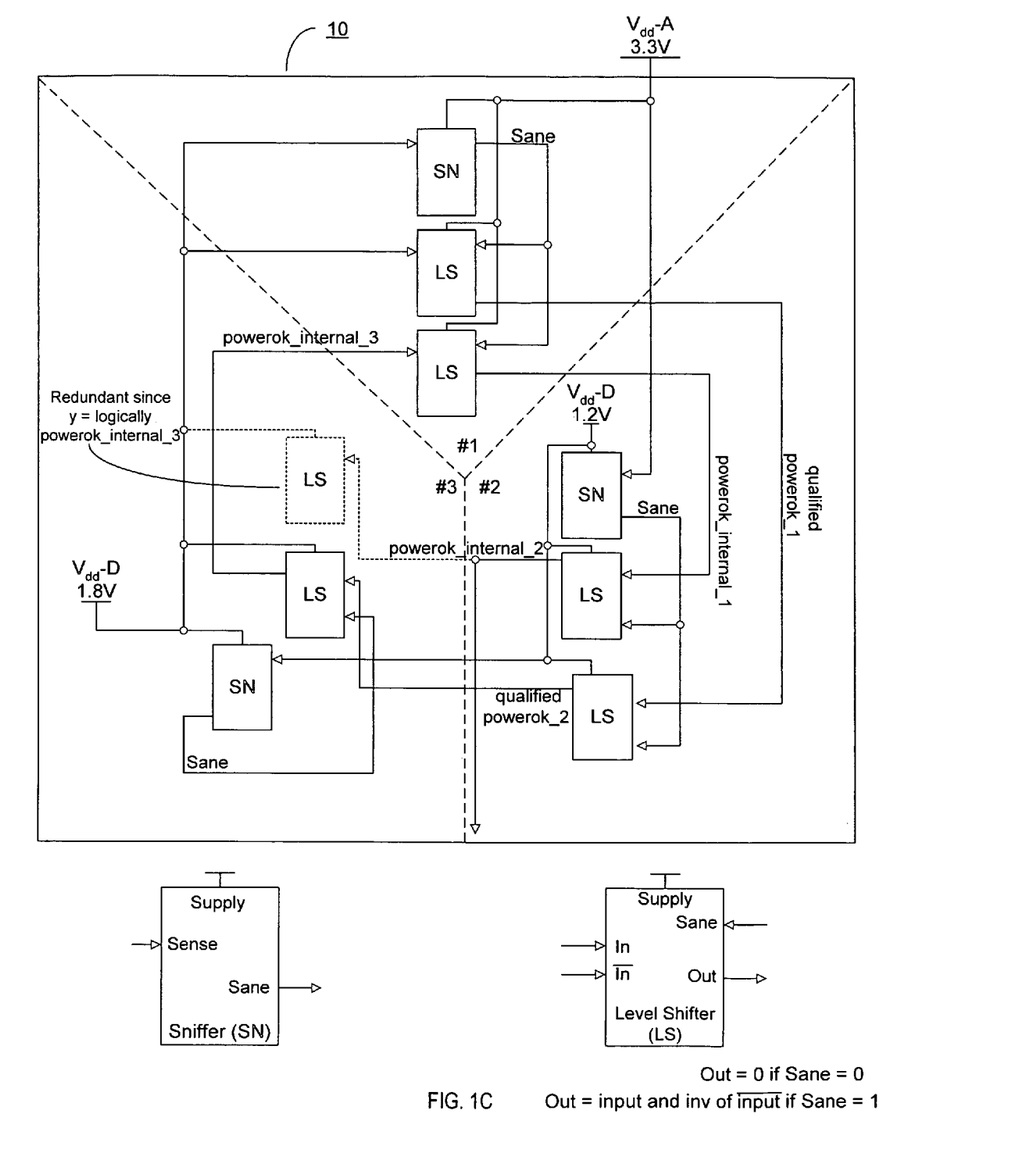
FIG. 1C is a drawing of another embodiment of an IC having a plurality of power domains.

FIGS. 1B and 1C illustrate alternate embodiments of IC 10. The embodiment shown in FIG. 1B is similar to that of FIG. 1A except that the power_ok_ext signal is provided to the power sensing unit 100 of power domain #3, while power domain #2 is the most downstream power domain. Generally speaking, any of the power domains may be coupled to be the most upstream power domain or the most downstream power domain, in accordance with any power sequencing requirements of the specific IC embodiment.

FIG. 1C illustrates another alternate embodiment of IC 10. For the sake of clarity, the power-sensing units shown in this drawing are separated into sniffer circuits (each labeled 'SN') and level shifters (each labeled 'LS'). In this particular embodiment, no external power ok signal is provided to IC 10. Instead, the sniffer circuit and one of the level shifters of power domain #1 are coupled to power from power domain #3 (i.e. 1.8 volts), wherein the power is received as an input signal (operating power for these circuits is received from within their own domain). The sniffer circuit of power domain #1 is coupled to provide a 'sane' signal to both of the level shifters within the domain. A first one of these level shifters is configured to assert a first power ok signal (powerok_internal_1) and a second one of these level shifters is configured to assert a second power ok signal (qualified_powerok_1). The second of these power ok signals is asserted if the respective level shifter has received 1.8-v power as an input as well has having received an asserted 'sane' signal from the sniffer circuit. A level shifter in power domain #2 is coupled to receive the qualified_powerok_1 signal. Responsive to receiving this signal and the 'sane' signal from the sniffer circuit of power domain #2, the respective level shifter #2 will assert another power ok signal, qualified_powerok_2. This power ok signal may be received by a level shifter in power domain #3. Upon receiving this power ok signal and the 'sane' signal from the sniffer circuit in power domain #3, this level shifter is configured to assert the powerok_internal_3 signal. The powerok_internal 3 signal may be received by the other level shifter of power domain #1, and eventually this may cause the powerok_internal_2 signal to be asserted in power domain #2. The powerok_internal_2 signal, when asserted, indicates that each power domain has been successfully powered up and that power in each domain is stable (i.e. sane). The powerok_internal_2 may be used in some embodiments to allow one or more power domains of IC10 to be released from a reset state that may otherwise be held until each of the power domains has received power as well as confirmation that it respective upstream domain has received power. In some embodiments, the entirety of IC 10 may be held in a reset state until all of the power ok signals have been asserted.

Each of the power sensing units in the various embodiments discussed above may include at least one level shifter circuit and may also include a sniffer circuit as shown in FIG. 1C. Some embodiments may include multiple level shifters, although in certain cases (as in power domain #3 shown in FIG. 1C), the second of these level shifters may be redundant and thus unnecessary. Additional details regarding power sensing units and embodiments of circuits used to implement them will be discussed in further detail below.

It should also be noted that embodiments implemented using topologies different than those shown in FIGS. 1A-1C are also possible and contemplated. For example, embodiments are possible and contemplated wherein a "fork" topology is implemented, wherein a first power sensing unit in a first power domain provides power ok signals to two or more downstream power sensing units. These downstream power sensing units may also be coupled to sense the presence of power in the upstream power domain (i.e. the first power domain in this example). In general, the topology may be any suitable topology for implementing a desired power-up sequence in an IC. Furthermore, various embodiments of the method and apparatus described herein may be extended to IC's having any number of power domains.

Figure 2:
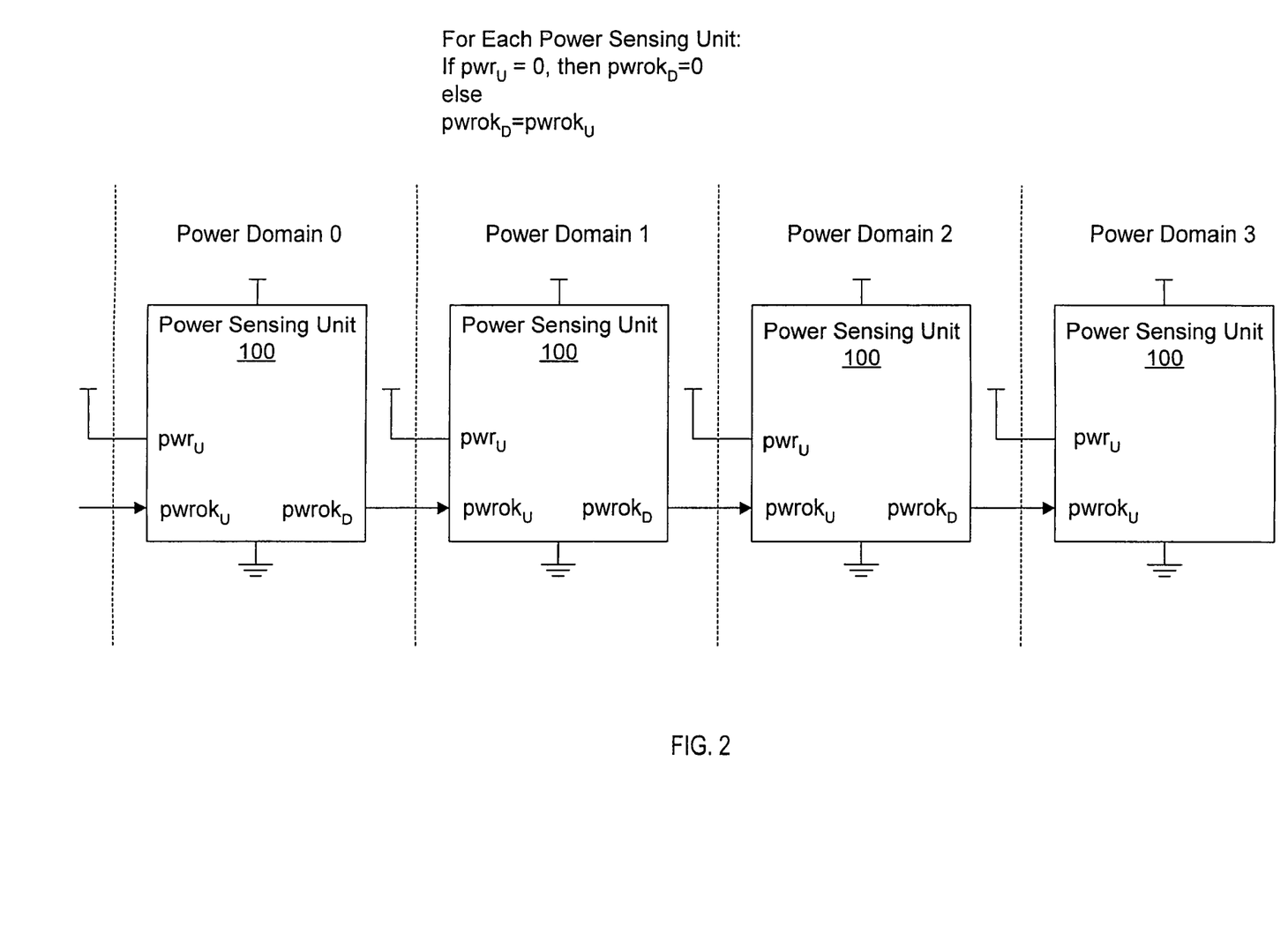
FIG. 2 is a drawing of illustrating one embodiment of a daisy chain of power-sensing units.

Turning now to FIG. 2, a drawing of illustrating one embodiment of a daisy chain of power-sensing units is shown. In the embodiment shown, four power domains are shown. Each power domain includes a power-sensing unit 100, and the power-sensing units are coupled together serially. While four power domains are shown here, a greater or lesser number of power domains may be present. Furthermore, additional power domains may precede power domain 0 (that is, power domain #0 may receive a signal on its $pwrok_U$ input from an upstream power domain) or follow power domain #3 (i.e. the signal provided by the $pwrok_D$ output is provided to a downstream power-sensing unit in another power domain). It is also contemplated that the four power domains shown here comprise all of the power domains for a particular IC embodiment.

As previously mentioned, the power-sensing units 100 of each power domain are coupled together serially. Power-sensing unit 100 of power domain #1 includes a $pwrok_U$ input that is coupled to the $pwrok_D$ output of the power-sensing unit in power domain 0. Power-sensing unit 100 of power domain #2 is similarly coupled to the power-sensing unit of power domain 1, while power-sensing unit 100 of power domain #3 is similarly coupled to the power-sensing unit of power domain #2.

Each power-sensing unit 100 is also coupled to receive power from the preceding upstream power domain on its respective $pwr_U$ input. Additionally, each power-sensing unit 100 may receive power from its own power domain. In various embodiments, each of the power-sensing units 100 may be implemented as level shifting circuits, as will be discussed in further detail below.

Each of the power-sensing units 100 shown in this embodiment includes an input labeled $pwrok_U$ and an output labeled $pwrok_D$. For the purposes of this disclosure, a signal asserted on the $pwrok_D$ output of a power-sensing unit 100 will be referred to as a downstream power ok signal, while a signal received on the $pwrok_U$ input of a power-sensing unit 100 will be referred to as an upstream power ok signal.

For the embodiment shown, in order for a power-sensing unit 100 of a given power domain to assert a downstream power ok signal, three conditions must be present. The first of these conditions is that the power-sensing unit 100 must receive an upstream power ok signal on its $pwrok_U$ input. It should be noted that this condition may not apply to the power-sensing unit of the furthest upstream power domain, which may instead only be required to receive power from its associated power source. The second condition is that power in the preceding upstream power domain must be sensed at the $pwr_U$ input of the power-sensing unit. The third condition is that the power-sensing unit 100 must be receiving the power required by its own power domain. If each of these conditions is satisfied, the power-sensing unit 100 may assert a downstream power ok signal to be provided to the power-sensing unit 100 of the next downstream power domain (if present) and to the entire power domain from which power-sensing unit receives its power.

Broadly speaking, when any power-sensing unit 100 is receiving power within its own power domain as well as detecting the presence of power in the upstream power domain, the state of the downstream power ok signal follows the state of the received upstream power ok signal. If power is detected in the upstream power domain, but no upstream power ok signal is received, the downstream power ok signal is not asserted. If upstream power is detected and the upstream power ok signal is received, then the power-sensing unit 100 asserts the downstream power ok signal responsive to the presence of both of these conditions. If a power-sensing unit 100 detects no upstream power, then it does not assert a downstream power ok signal, regardless of any signal that may be received on its $pwrok_U$ input.

If the power domain in which the power-sensing unit 100 is in is the most downstream power domain, the downstream power ok signal may still be asserted, but may be provided to a destination external to the IC in which each of the power domains reside. Alternatively, the downstream power ok signal may be provided to another destination within the IC. In some embodiments, the circuitry residing in each of the power domains may be held in a reset state until the downstream power ok signal of the furthest downstream power domain is asserted. The assertion of the downstream power ok signal may indicate that each of the power domains in the IC is receiving its required power, and it is thus safe to begin any initialization routines or to begin operation.

Figure 3:
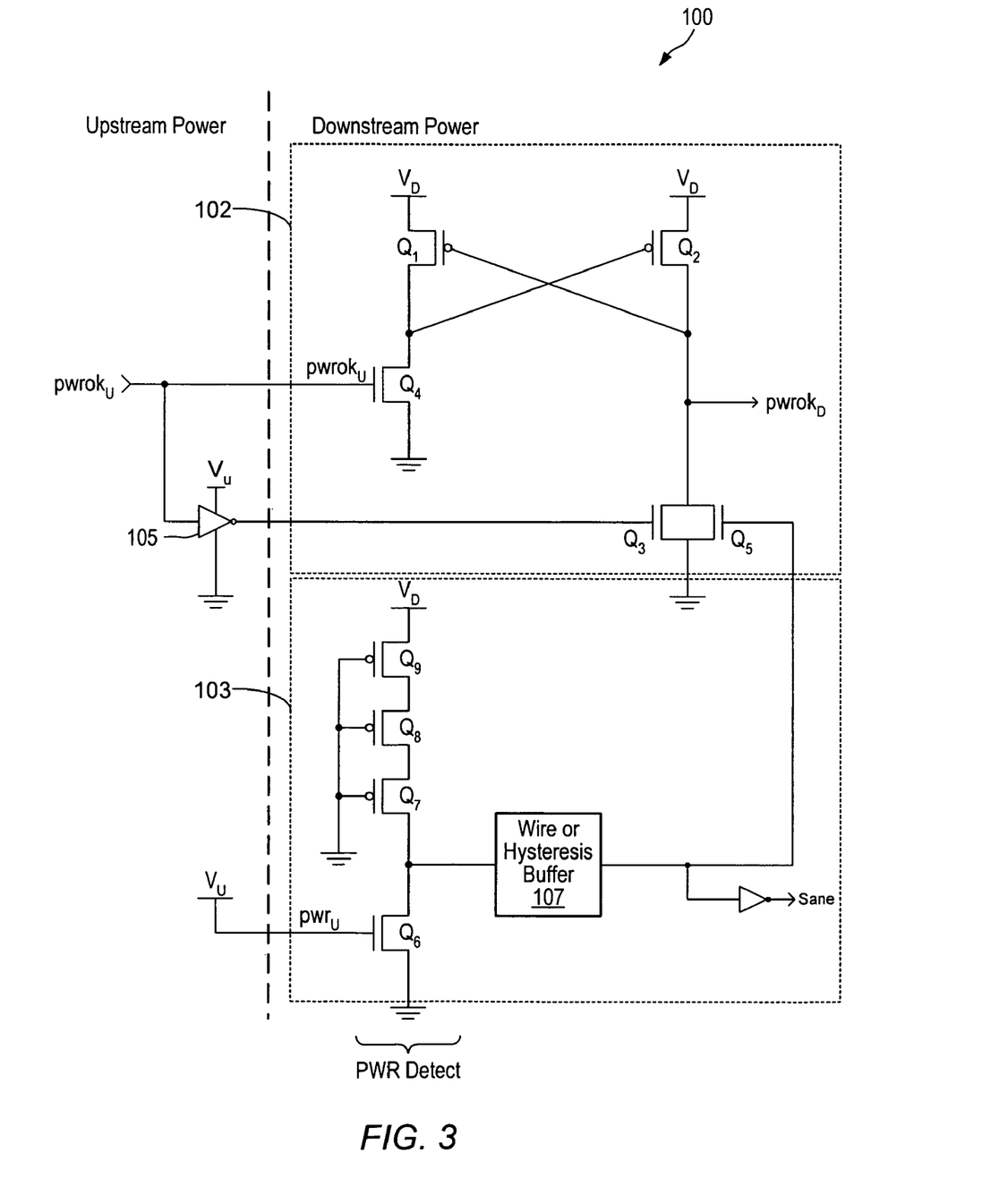
FIG. 3 is a schematic diagram of a power-sensing unit and level shifter for pwrok.

Moving now to FIG. 3, a schematic diagram of an embodiment of a power sensing unit configured to detect power from another power domain is shown. In the embodiment shown, power sensing unit includes a level shifter circuit 102 and a sniffer circuit 103. In this embodiment of power-sensing unit 100, the $pwrok_U$ input is the gate terminal of transistor Q4, while the upstream power input ($pwr_U$) is the gate terminal of transistor Q6.

Assuming power is present in the downstream power domain, but no power is present in the upstream power domain, transistor Q6 will remain off. Transistors Q7, Q8, and Q9 remain on, as their respective gate terminals are hardwired to ground. Thus, the junction connecting transistors Q6 and Q7 is pulled up to voltage $V_D$. This voltage is transferred via a wire or hysteresis buffer 107 to transistor Q5. With sufficient voltage on its gate terminal, transistor Q5 is turned on, and thus pulls the voltage present on the $pwrok_D$ output down to ground. Wire/hysteresis buffer 107 may slow the turning on or off of transistor Q5, by making sure upstream power is fully turned on or off before causing it to change states.

When power is present in the upstream power domain, transistor Q6 is turned on. With transistor Q6 turned on, the voltage present on the junction between transistors Q6 and Q7 is sufficiently pulled down, and this voltage is transferred through the wire/hysteresis buffer 107 to the gate terminal of transistor Q5, thereby turning it off. At this point, the $pwrok_D$ output is dependent upon the state of the $pwrok_U$ input. If the $pwrok_U$ input is a logic 0 then the output of inverter 105 is a logic 1 and with upstream power present, the voltage on the gate of Q3 is sufficient to turn Q3 on an pull $pwrok_D$ to ground, thereby turning on Q1 and turning off Q2, while Q4 is also off. If the $pwrok_U$ input is a logic 1, the output of inverter 105 is a logic 0 and Q3 is off, and if power is present in the upstream domain there is sufficient voltage to turn on Q4 which causes Q2 to be turned on and thus the $pwrok_D$ output is pulled to a logic 1, while Q1 is turned off.

Figure 4:
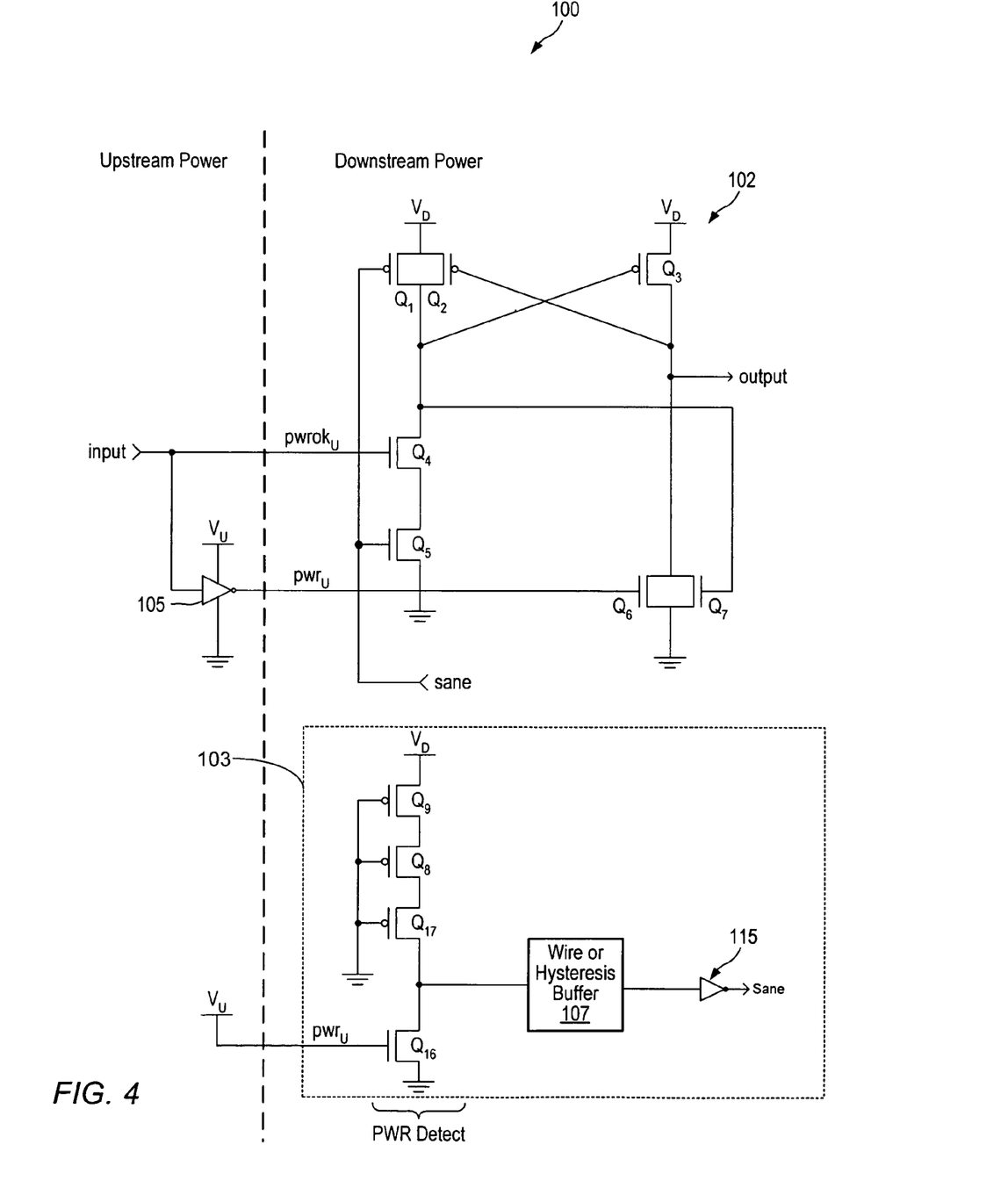
FIG. 4 is a schematic diagram of another embodiment a power-sensing unit including a level shifter with a default condition when not pwrok.

Turning now to FIG. 4, a schematic diagram of another embodiment of power sensing circuit is shown, wherein the level shifter circuit is configured to assert a default condition while a power ok signal is deasserted. This embodiment includes a level shifter circuit 102 that is similar to that discussed in reference to FIG. 3, although it includes an input for a sane signal which is provided to the gate terminals of transistors Q1 and Q5. The sane signal may be provided from a downstream power domain, including the downstream power domain shown here. In one embodiment, the sane input may be directly coupled to the output of the same downstream power domain. In other embodiments, the sane input may be provided from a power domain that is further downstream (with the use of a level shifter, which is required to cross from one power domain to another). It is also noted that additional logic may be used to produce the sane signal, either in the power domain to which it is provided or another downstream power domain where it may be generated.

Assuming that both upstream power has been detected and the $pwrok_D$ signal from the upstream power domain is asserted, an asserted sane signal causes transistor Q5 to be turned on and transistor Q1 to be turned off. This will allow the output of level shifter 102 to be controlled by its input, since the output follows the input whenever the sane signal is a logic 1. If for any reason, the received sane signal becomes de-asserted transistor Q5 will be turned off while transistor Q1 will be turned on. This will cause transistor Q3 to be turned off, while transistor Q7 will be turned on, causing a de-assertion of the output signal. Transistor Q5 may interrupt the pulldown of Q4 when upstream power is present but sane is low (i.e. logic 0), thereby allowing Q1 to turn on without contention, turning on Q7 and pulling $pwrok_D$ low.

Power sensing unit 100 in this particular embodiment also includes a sniffer circuit 103, which may generate the sane signal. Upstream power ($V_U$) may turn on transistor Q16. This results in the signal coupled to the input of inverter 115 being pulled low. In the embodiment shown, the pulling low of this node may be delayed by the wire/hysterisis buffer 107, although embodiments without this delay are possible and contemplated. The pulling low of the input of inverter 115 thus results in the sane signal being asserted. The sane signal asserted by inverter 115 may be provided to the sane input of level shifter 102 or to a sane input of another level shifter in another power domain.

The use of the sane signal in the embodiment discussed above may prevent potentially illegal behavior of the circuit of level shifter 102, and may also prevent potential damage to the circuitry in certain situations. For example, if upstream power is lost, both the inputs to transistors Q4 and Q6 fall substantially to ground. If no sane signal was present (and thus no Q5 and no input to Q1), it is possible that the junction of transistors Q4 and Q2, along with the $pwrok_D$ output of the downstream power domain would fall to a mid-rail voltage. In this situation, significant crowbar currents may be flowing in embodiments not configured to utilize the sane signal. These currents could potentially damage transistors within the circuit. Furthermore, if the $pwrok_D$ output is at mid-rail, it is possible that a power-sensing unit of a downstream power domain could interpret it to be asserted. Thus, the use of a sane signal as shown in this embodiment may ensure that the $pwrok_D$ signal is pulled down to ground and is thus not misinterpreted as being asserted, while preventing potential circuit damage due to crowbar currents. In other words, coupling the gate of transistor Q5 to receive the sane signal prevents the input signal provided to Q4 ($pwrok_U$) from controlling the output of the circuit when sane is de-asserted. The logical control provided by the $pwrok_U$ signal is thus dependent on the sane signal first being asserted.

The circuits shown above are examples of circuits that may be used to implement the various functions required by power sensing units. Other circuits that accomplish the level shifting functions and/or the power sensing (i.e. 'sniffer' circuits) are also possible and contemplated. In general, the circuits used to implement the power sensing units may be configured to the specific implementation in which they are used as well as their respective positions in the power sequencing hierarchy.

Figure 5:
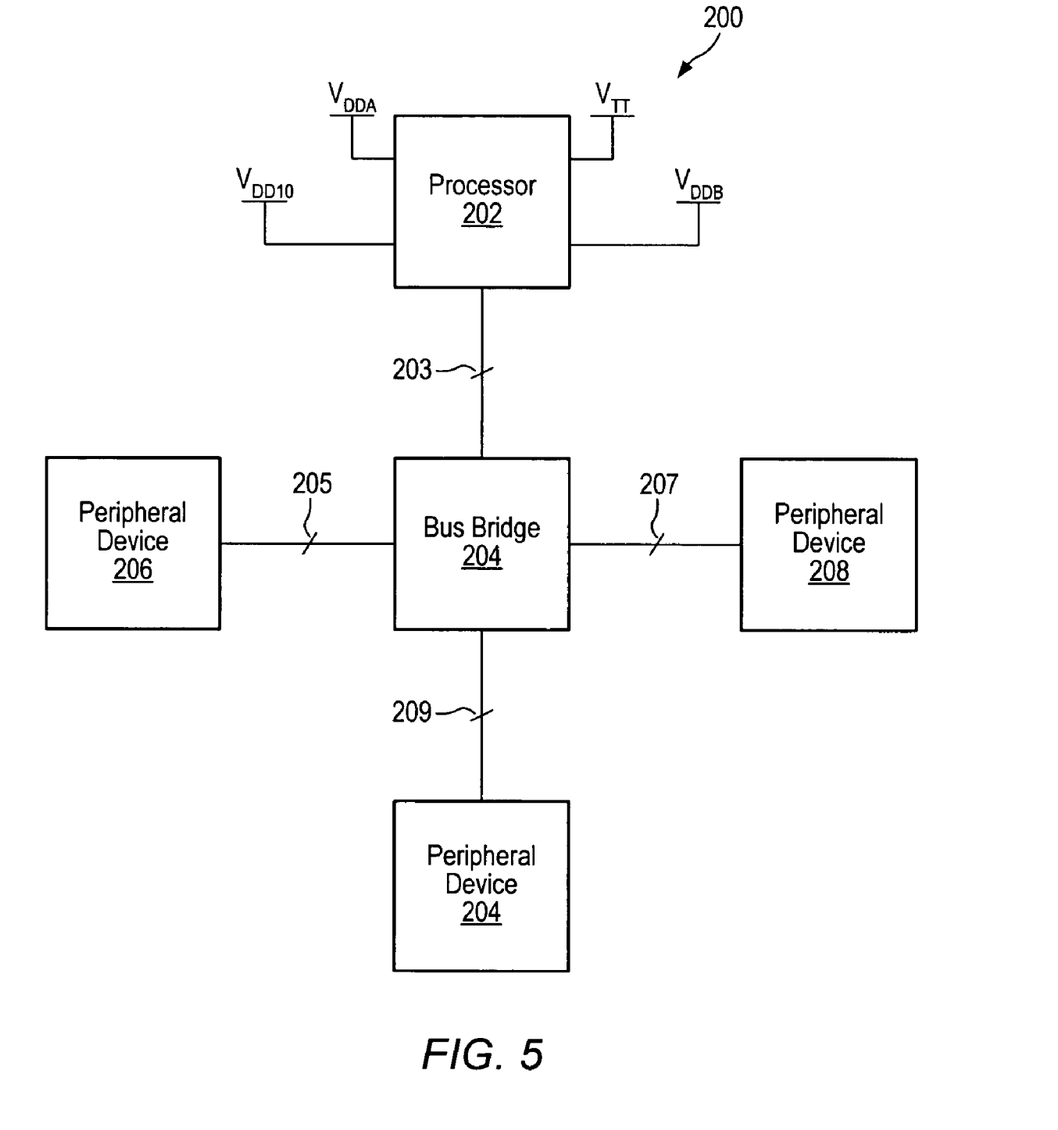
FIG. 5 is a block diagram of one embodiment of a computer system having a processor with multiple power domains.

Turning now to FIG. 5, a block diagram of one embodiment of a computer system having a processor with multiple power domains is shown. In the embodiment shown, computer system 200 includes processor 202, which is coupled to bus bridge 204 via processor bus 203. Bus bridge 204 is coupled to peripheral devices 206, 208, and 210 via buses 205, 207, and 209, respectively.

Computer system 200 includes a plurality of power sources, as indicated by the various voltage symbols shown in the drawing (i.e. $V_{DDA}$, $V_{DDB}$, $V_{DDio}$, and $V_{TT}$). Embodiments having additional power sources are possible and contemplated, as are embodiments having fewer power sources than shown here.

Processor 202 in this particular embodiment includes multiple power domains, and is thus coupled to receive multiple power supply voltages. Processor 202 may include a power-sensing unit in each of the power domains. The power-sensing units of the various power domains may be coupled together in a manner similar to that shown in FIGS. 1A-1C and FIG. 2, wherein each power-sensing unit may be required to both detect the presence of power in an upstream power domain as well as receiving a power ok signal from the upstream power domain. Upon startup of computer system 200, processor 202 may be held in a reset state until each of the power-sensing units of the respective power domains has asserted a power ok signal.

It should be noted that this system is exemplary. Other electronic systems may also utilize multi-voltage integrated circuits having the same power-up scheme as that described above. The multi-voltage integrated circuits in such electronic systems may include processors or other types of integrated circuits. Furthermore, other embodiments of such electronic systems may include more than one multi-voltage integrated circuit having the power-up scheme described herein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. An integrated circuit comprising:
    a plurality of power domains, wherein each of the plurality of power domains is coupled to receive power from one of a plurality of power sources, and wherein each of the power domains includes a power-sensing unit;
    wherein a power-sensing unit of a first one of the plurality of power domains is coupled to receive a first power ok signal and configured to assert a second power ok signal responsive to receiving the first power ok signal; and
    wherein a power-sensing unit of a second one of the plurality of power domains is coupled to detect a presence of power in the first power domain and is further coupled to receive the second power ok signal and is configured to assert a third power ok signal responsive to detecting the presence of power in the first power domain and receiving the second power ok signal.

2. The integrated circuit as recited in claim 1 further comprising a third one of the plurality of power domains, wherein a power-sensing unit of the third power domain is coupled to sense a presence of power in the second power domain and is further coupled to receive the third power ok signal, wherein the power-sensing unit of the third power domain is configured to assert a fourth power ok signal responsive to sensing the presence of power in the second power domain and receiving the third power ok signal.

3. The integrated circuit as recited in claim 2, wherein the power-sensing units of the first, second, and third power domains are coupled in series, wherein the first power domain is upstream with respect to the second power domain, and wherein the third power domain is downstream with respect to the second power domain.

4. The integrated circuit as recited in claim 3, further comprising a fourth one of the plurality of power domains, wherein a power-sensing unit of the fourth power domain is coupled to sense a presence of power in the third power domain and is further coupled to receive the fourth power ok signal, wherein the power-sensing unit of the fourth power domain is configured to assert a fifth power ok signal responsive to sensing the presence of power in the third power domain and receiving the fourth power ok signal.

5. The integrated circuit as recited in claim 2, wherein the integrated circuit is held in a reset state until a power ok signal is asserted by a power-sensing unit for each of the plurality of power domains.

6. The integrated circuit as recited in claim 2, wherein the power-sensing unit of each of the plurality of power domains includes a level shifting circuit, wherein the level shifting circuit is configured to assert a downstream power ok signal.

7. The integrated circuit as recited in claim 6, wherein the first power domain is configured to operate at a first voltage and the second power domain is configured to operate at a second voltage different from the first voltage, and wherein the level shifting circuit is configured to receive the second power ok signal at substantially the first voltage and to generate the third power ok signal at substantially the second voltage.

8. The integrated circuit as recited in claim 6, wherein the power-sensing unit of each of the plurality of power domains is further coupled to receive a sane signal, wherein its downstream power ok signal remains asserted when the sane signal is asserted.

9. The integrated circuit as recited in claim 8, wherein the power-sensing unit of each of the plurality of power domains is configured to de-assert the downstream power ok signal if the sane signal becomes de-asserted.

10. The integrated circuit as recited in claim 8, wherein the level shifting circuit includes a hysteresis buffer, wherein the hysteresis buffer is configured to delay the assertion of the downstream power ok signal until the one of the plurality of power domains immediately upstream is operating at its specified voltage.

11. A method for powering on an integrated circuit, the method comprising:
providing power to each of a plurality of power domains in the integrated circuit, a first of the plurality of power domains receiving a first power ok signal and asserting a second power ok signal responsive to receiving the first power ok signal;

a power-sensing unit in a second one of the plurality of power domains detecting a presence of power in the first power domain;
the power-sensing unit receiving the second power ok signal; and
the power-sensing unit asserting a third power ok signal responsive to detecting the presence of power in the first power domain and receiving the second power ok signal.

12. The method as recited in claim 11, wherein each of the plurality of power domains includes a power-sensing unit.

13. The method as recited in claim 12 further comprising power-sensing unit of a third power domain sensing presence of power in the second power domain and receiving the third power ok signal and asserting a fourth power ok signal responsive to sensing the presence of power in the second power domain and receiving the third power ok signal.

14. The method as recited in claim 13 further comprising a power-sensing unit in a fourth power domain sensing presence of power in the third power domain and receiving the fourth power ok signal and asserting a fifth power ok signal responsive to sensing the presence of power in the third power domain and receiving the fourth power ok signal.

15. The method as recited in claim 13, wherein the power-sensing units of the first, second, and third power domains are coupled in series, wherein the first power domain is upstream with respect to the second power domain, and wherein third power domain is downstream with respect to the power-sensing unit of the second power domain.

16. The method as recited in claim 15, wherein the power-sensing unit of each of the plurality of power domains includes a level shifting circuit, wherein the level shifting circuit is configured to assert a downstream power ok signal.

17. The method as recited in claim 16, wherein the first power domain is configured to operate at a first voltage and the second power domain is configured to operate at a second voltage different from the first voltage, and wherein the level shifting circuit is configured to receive the second power ok signal at substantially the first voltage and to generate the third power ok signal at substantially the second voltage.

18. The method as recited in claim 16, wherein the power-sensing unit of each of the plurality of power domains is further coupled to receive a sane signal, wherein the third power ok signal remains asserted when the sane signal is asserted.

19. The method as recited in claim 18, wherein the downstream power ok signal is de-asserted if the sane signal becomes de-asserted.

20. The method as recited in claim 16, wherein the level shifting circuit includes a hysteresis buffer, wherein the hysteresis buffer is configured to delay the assertion of the downstream power ok signal until power in the one of the plurality of power domains immediately upstream is operating at its specified voltage.

21. The method as recited in claim 12 further comprising holding the integrated circuit in a reset state until a power ok signal is asserted by a power-sensing units in each of the plurality of power domains.

22. A system comprising:
a plurality of power sources;
an integrated circuit having a plurality of power domains, wherein each of the plurality of power domains is coupled to receive power from one of the plurality of power sources, and wherein each of the plurality of power domains includes a power-sensing unit;
wherein a power-sensing unit of a first one of the plurality of power domains is coupled to receive a first power ok signal and configured to assert a second power ok signal responsive to receiving the first power ok signal; and wherein a power-sensing unit of a second one of the plurality of power domains is coupled to detect a presence of power in the first power domain and is further coupled to receive the second power ok signal, and wherein the power-sensing unit of the second power domain is configured to assert a third power ok signal responsive to detecting the presence of power in the first power domain and receiving the second power ok signal.

23. The system as recited in claim 22, wherein the integrated circuit includes a third one of the plurality of power domains, wherein a power-sensing unit of the third power domain is coupled to sense a presence of power in the second power domain and is further coupled to receive the third power ok signal, wherein the power-sensing unit of the third power domain is configured to assert a fourth power ok signal responsive to sensing the presence of power in the second power domain and receiving the third power ok signal.

24. The system as recited in claim 23, wherein the power-sensing units of the first, second, and third power domains are coupled in series, wherein the first power domain is upstream with respect to the second power domain, and wherein the third power domain is downstream with respect to the second power domain.

25. The system as recited in claim 24, wherein the integrated circuit includes a fourth one of the plurality of power domains, wherein a power-sensing unit of the fourth power domain is coupled to sense a presence of power in the third power domain and is further coupled to receive the fourth power ok signal, wherein the power-sensing unit of the fourth power domain is configured to assert a fifth power ok signal responsive to sensing the presence of power in the third power domain and receiving the fourth power ok signal.

26. The system as recited in claim 23, wherein the integrated circuit is held in a reset state until a power ok signal is asserted by a power-sensing unit for each of the plurality of power domains.

27. The system as recited in claim 23, wherein the power-sensing unit of each of the plurality of power domains includes a level shifting circuit, wherein the level shifting circuit is configured to assert a downstream power ok signal.

28. The system as recited in claim 27, wherein the first power domain is configured to operate at a first voltage and the second power domain is configured to operate at a second voltage different from the first voltage, and wherein the level shifting circuit is configured to receive the second power ok signal at substantially the first voltage and to generate the third power ok signal at substantially the second voltage.

29. The system as recited in claim 27, wherein the power-sensing unit of each of the plurality of power domains is further coupled to receive a sane signal, wherein the downstream power ok signal remains asserted when the sane signal is asserted.

30. The system as recited in claim 29, wherein the power-sensing unit of each of the plurality of power domains is configured to de-assert the downstream power ok signal if the sane signal becomes de-asserted.

31. The system as recited in claim 27, wherein the level shifting circuit includes a hysteresis buffer, wherein the hysteresis buffer is configured to delay the assertion of the downstream power ok signal until power the one of the plurality of power domains immediately upstream is operating at its specified voltage.

32. An integrated circuit comprising:
a plurality of power domains, wherein each of the plurality of power domains is configured to receive power from a respective one of a plurality of power supplies; and
a first power-sensing unit coupled to receive a first signal indicating that at least one of the plurality of power domains is receiving power from its respective power supply, wherein the first power-sensing unit is further configured to sense presence of power one of the plurality of power domains, and wherein the first power-sensing unit is configured to assert a second signal responsive to receiving the first signal and detecting the presence of power in the one of the plurality of power domains;
wherein the plurality of power domains includes first and second ones of the plurality of power domains, and wherein the first power-sensing unit is in the second one of the plurality of power domains.

33. The integrated circuit as recited in claim 32, further comprising a third one of the plurality of power domains, wherein the third one of the plurality of power domains includes a second power-sensing unit, wherein the second power-sensing unit is coupled to receive the second signal, wherein the second power-sensing unit is configured to sense presence of power in the third one of the plurality of power domains and to assert a third signal responsive to detecting the presence of power in the third one of the plurality of power domains and receiving the second signal.

34. The integrated circuit as recited in claim 33, wherein the first, second, and third ones of the plurality of power domains are coupled in series.

35. The integrated circuit as recited in claim 32, wherein each of the plurality of power domains includes a corresponding one of a plurality of power-sensing units, wherein the plurality of power-sensing units are coupled in a series configuration.

36. The integrated circuit as recited in claim 35, wherein the integrated circuit is configured to be held in a reset state until one of the plurality of power-sensing units asserts a signal indicating that power is present and stable in each of the plurality of power domains.

37. The integrated circuit as recited in claim 32, wherein the first power-sensing unit includes a level shifting circuit, wherein the level shifting circuit is configured to assert the second signal.

38. The integrated circuit as recited in claim 37, wherein the level shifting circuit includes a hysteresis buffer, wherein the hysteresis buffer is configured to delay the assertion of the second signal.

39. The integrated circuit as recited in claim 32, wherein a first one of the plurality of power domains configured to operate at a first voltage and wherein a second one of the plurality of power domains includes circuitry configured to operate at a second voltage different from the first voltage.

40. An integrated circuit comprising:
a first power domain configured to receive power from a first power source;
a second power domain configured to receive power from a second power source; and
a first power-sensing unit coupled to receive a first signal indicating that at least one of the first and second power sources is providing power to its respective power domain, wherein the first power-sensing unit is configured to sense a presence of power in the first and second power domains, and further configured to assert a second signal responsive to receiving the first signal and sensing the presence of power in at least one of the first or second power domains;

wherein the first power-sensing unit is in the second power domain.

41. The integrated circuit as recited in claim 40, further comprising a third power domain having a second power-sensing unit, wherein the second power-sensing unit is coupled to receive the second signal and is configured to sense a presence of power in the third power domain, wherein the second power-sensing unit is configured to assert a third signal responsive to receiving the second signal and sensing the presence of power in the third power domain.

42. The integrated circuit as recited in claim 41, further comprising a fourth power domain having a third power-sensing unit, wherein the third power-sensing unit is coupled to receive the third signal and configured to sense a presence of power in the fourth power domain, wherein the third power-sensing unit is configured to assert a fourth signal responsive to receiving the third signal and sensing the presence of power in the fourth power domain.

43. The integrated circuit as recited in claim 42, wherein the first, second, and third power-sensing units are coupled in series.

44. The integrated circuit as recited in claim 40, wherein the integrated circuit includes a plurality of power-sensing units including the first power-sensing unit, wherein the plurality of power-sensing units are coupled in series, wherein each of the plurality of power-sensing units is associated with a corresponding one of a plurality of power domains each coupled to receive power from a corresponding one of a plurality of power sources, and wherein the plurality of power domains includes the first and second power domains.

45. The integrated circuit as recited in claim 44, wherein the integrated circuit is configured to be held in a reset state until a last one of the plurality of power-sensing units asserts a signal indicating that each of the plurality of power domains is receiving power.

46. The integrated circuit as recited in claim 45, wherein the last one of the plurality of power-sensing units is coupled to provide the signal to an external pin of the integrated circuit.

47. The integrated circuit as recited in claim 40, wherein the power-sensing unit includes a hysterisis buffer, wherein the hysterisis buffer is configured to delay the assertion of the second signal.

48. An integrated circuit comprising:

a plurality of power domains, wherein each of the plurality of power domains is configured to receive power from a respective one of a plurality of power supplies; and a first power-sensing unit coupled to receive a first signal indicating that at least one of the plurality of power domains is receiving power from its respective power supply, wherein the first power-sensing unit is configured to sense a presence of power in one of the plurality of power domains, and wherein the first power-sensing unit is further configured to assert a second signal responsive to receiving the first signal and detecting the presence of power in the one of the plurality of power domains;

wherein each of the plurality of power domains includes a corresponding one of a plurality of power-sensing units, wherein the plurality of power-sensing units are coupled in a series configuration.

49. An integrated circuit comprising:

a first power domain configured to receive power from a first power source;

a second power domain configured to receive power from a second power source; and a first power-sensing unit coupled to receive a first signal indicating that at least one of the first and second power sources is providing power to its respective power domain, wherein the first power-sensing unit is configured to sense a presence of power in the first and second power domains, and further configured to assert a second signal responsive to receiving the first signal and sensing the presence of power in at least one of the first or second power domains;

wherein the integrated circuit includes a plurality of power-sensing units including the first power-sensing unit, wherein the plurality of power-sensing units are coupled in series, wherein each of the plurality of power-sensing units is associated with a corresponding one of a plurality of power domains each coupled to receive power from a corresponding one of a plurality of power sources, and wherein the plurality of power domains includes the first and second power domains.

* * * * *